(12) United States Patent
Duffield et al.

(10) Patent No.: US 7,424,489 B1
(45) Date of Patent: *Sep. 9, 2008

(54) METHODS AND APPARATUS FOR SPACE EFFICIENT ADAPTIVE DETECTION OF MULTIDIMENSIONAL HIERARCHICAL HEAVY HITTERS

(75) Inventors: Nicholas Duffield, Summit, NJ (US); Carsten Lund, Berkeley Heights, NJ (US); Subhabrata Sen, New Providence, NJ (US); Yin Zhang, Austin, TX (US)

(73) Assignee: AT&T Corp., New York, NY (US)

( * ) Notice: Subject to any disclaimer, the term of this patent is extended or adjusted under 35 U.S.C. 154(b) by 506 days.

This patent is subject to a terminal disclaimer.

(21) Appl. No.: 11/042,714

(22) Filed: Jan. 24, 2005

Related U.S. Application Data

(60) Provisional application No. 60/538,720, filed on Jan. 23, 2004.

(51) Int. Cl.
*G06F 17/00* (2006.01)
*G06F 7/00* (2006.01)

(52) U.S. Cl. .................... 707/104.1; 707/100

(58) Field of Classification Search ............... 370/352, 370/395.5, 338, 310, 277; 714/57; 707/104, 707/100–102, 104.1; 726/22
See application file for complete search history.

(56) References Cited

U.S. PATENT DOCUMENTS

| | | | |
|---|---|---|---|
| 6,396,842 B1 * | 5/2002 | Rochberger | 370/408 |
| 6,980,537 B1 * | 12/2005 | Liu | 370/338 |
| 7,099,881 B2 * | 8/2006 | Richardson et al. | 707/100 |
| 2004/0057424 A1 * | 3/2004 | Kokkonen | 370/352 |
| 2004/0111420 A1 * | 6/2004 | Hofstee et al. | 707/100 |
| 2005/0039086 A1 * | 2/2005 | Krishnamurthy et al. | 714/57 |

OTHER PUBLICATIONS

"Diamond in the Rough: Finding Hierarchical Heavy Hitters in Multi-dimensional Data", Graham Comode et al., http://www.cs.rutgers.edu/~muthu/h4.pdf.*
"Online Identification of Hierarchical Heavy Hitters: Algorithms, Evaluation, and Application", Yin Zhang et al., IMC 2004.*
"Approximate Frequency Counts over Data Streams" Gurmeet Singh Manku et al., Proceeding of the 28th VLDB Conference, Honk Kong, China 2002.*

* cited by examiner

*Primary Examiner*—Hung T Vy

(57) ABSTRACT

The present invention develops an efficient streaming method for detecting multidimensional hierarchical heavy hitters from massive data streams and enables near real time detection of anomaly behavior in networks.

4 Claims, 8 Drawing Sheets

BEFORE UPDATE

AFTER UPDATE

METHODS AND APPARATUS FOR SPACE EFFICIENT ADAPTIVE DETECTION OF MULTIDIMENSIONAL HIERARCHICAL HEAVY HITTERS

This application claims the benefit of U.S. Provisional Application No. 60/538,720 filed on Jan. 23, 2004, which is herein incorporated by reference.

The present invention relates generally to traffic monitoring and, more particularly, to a method and apparatus for identifying multidimensional hierarchical heavy hitters for monitoring one or more networks, e.g., packet switched communication networks such as VoIP networks.

BACKGROUND OF THE INVENTION

The Internet has emerged as a critical communication infrastructure, carrying traffic for a wide range of important scientific, business and consumer applications. Network service providers and enterprise network operators need the ability to detect anomalous events in the network, for network management and monitoring, reliability, security and performance reasons. While some traffic anomalies are relatively benign and tolerable, others can be symptomatic of potentially serious problems such as performance bottlenecks due to flash crowds, network element failures, malicious activities such as denial of service attacks (DoS), and worm propagation. It is therefore very important to be able to detect traffic anomalies accurately and in near real-time, to enable timely initiation of appropriate mitigation steps.

One of the main challenges of detecting anomalies is the mere volume of traffic and measured statistics. Given today's traffic volume and link speeds, the input data stream can easily contain millions or more of concurrent flows, so it is often impossible or too expensive to maintain per-flow state. The diversity of network types further compounds the problem. Thus, it is infeasible to keep track of all the traffic components and inspect each packet individually for anomaly behavior.

Another major challenge for anomaly detection is that traffic anomalies often have very complicated structures: they are often hierarchical (i.e. they may occur at arbitrary aggregation levels like ranges of IP addresses and port numbers) and multidimensional (i.e. they can only be exposed when we examine traffic with specific combinations of IP address ranges, port numbers, and protocol). In order to identify such multidimensional hierarchical traffic anomalies, a naive approach would require examining all possible combinations of aggregates, which can be prohibitive even for just two dimensions. Another important challenge stems from the fact that existing change detection methods utilize usage measurements that are increasingly sampled.

Therefore, a need exists for a method and apparatus for near real-time detection of multidimensional hierarchical heavy hitters in packet-switched networks, (e.g., Voice over Internet Protocol (VoIP) networks), that can also accommodate sampling variability.

SUMMARY OF THE INVENTION

In one embodiment, the present invention discloses an efficient streaming method and apparatus for detecting multidimensional hierarchical heavy hitters from massive data streams with a large number of flows. The data structure is adaptive to the offered traffic and carries a synopsis of the traffic in the form of a set of estimated hierarchical aggregates of traffic activity. The structure is adapted in that each aggregate contains no more than a given proportion of the total activity unless the aggregates are not further divisible.

This method has much lower worst-case update cost than existing methods, and provides deterministic accuracy that is independent of the offered data. In one embodiment, the invention provides a method for adjusting the threshold proportion for detection. Therefore, the level of reported detail can be traded off against the computational time. The invention also accommodates the inherent sampling variability within the predictive method.

BRIEF DESCRIPTION OF THE DRAWINGS

The teaching of the present invention can be readily understood by considering the following detailed description in conjunction with the accompanying drawings, in which:

FIG. 6 illustrates the rectangular search structure before update;

FIG. 7 illustrates the rectangular search structure after update;

To facilitate understanding, identical reference numerals have been used, where possible, to designate identical elements that are common to the figures.

DETAILED DESCRIPTION

The present invention broadly discloses a method and apparatus for detecting hierarchical heavy hitters. Although the present invention is discussed below in the context of detecting traffic anomalies in a network, the present invention is not so limited. Namely, the present invention can be applied in the context of datamining, trending, forecasting, outlier detection and the like. Furthermore, although the present invention is discussed below in the context of packets, the present invention is not so limited. Namely, the present invention can be applied in the context of records, fields, or any other unit or measure of data. For the purpose of scope, the term packet is intended to broadly include a record or a field.

Figure 1:
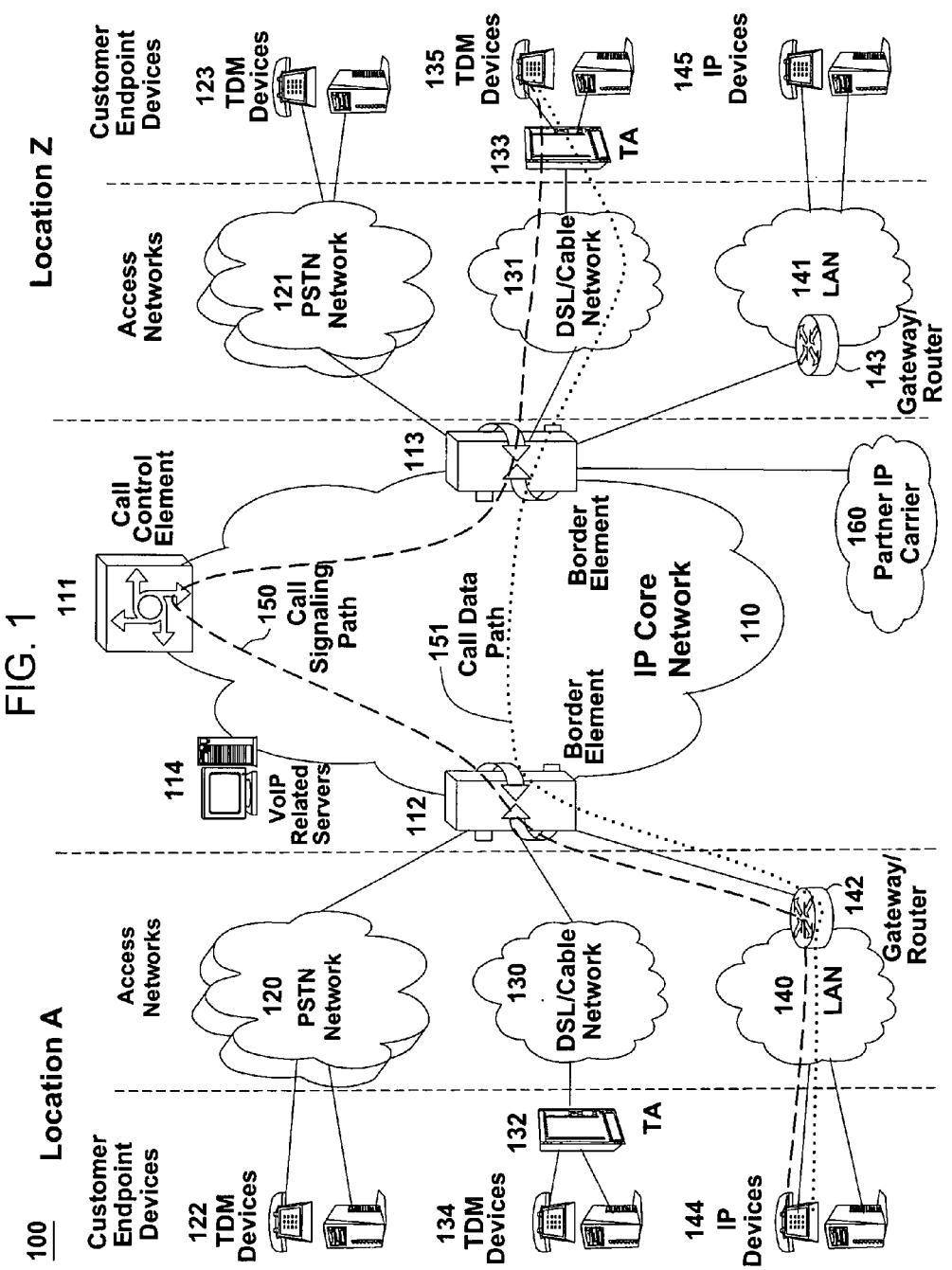
FIG. 1 illustrates an exemplary network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol (IP) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA-132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which a large quantity of packets may traverse throughout the entire network. It would be advantageous to be able to detect anomalous events in the network to monitor performance bottleneck, reliability, security, malicious attacks and the like. In order to so, it would be advantageous to first detect "heavy hitters". In one embodiment, the present multi-dimensional hierarchical heavy hitter detection method as discussed below can be implemented in an application server of the VoIP network.

In order to clearly illustrate the present invention, the following packet network related concepts will first be described. These concepts are that of:
 a. A Heavy Hitter (HH);
 b. A Hierarchical Heavy Hitter (HHH);
 c. A multidimensional hierarchical heavy hitter;
 d. A child node
 e. A fringe node; and
 f. An internal node.

A Heavy Hitter (HH) is an entity that accounts for at least a specified proportion of the total activity measured in terms of number of packets, bytes, connections etc. A heavy hitter could correspond to an individual flow or connection. It could also be an aggregation of multiple flows/connections that share some common property, but which themselves may not be heavy hitters.

Of particular interest to packet network application is the notion of hierarchical aggregation. IP addresses can be organized into a hierarchy according to prefix. The challenge for hierarchical aggregation is to efficiently compute the total activity of all traffic matching relevant prefixes.

A hierarchical heavy hitter is a hierarchical aggregate that accounts for some specified proportion of the total activity.

Aggregations can be defined on one or more dimensions, e.g., source IP address, destination IP address, source port, destination port, and protocol fields for IP flows.

Multidimensional Heavy Hitters are multidimensional sets of hierarchical aggregates that account for some specified proportion of the total activity.

In one embodiment, the invention is illustrated with a data network structure used to identify address prefixes in IP network. Each node is associated with a prefix. A child of a node shares the prefix of the parent node but has an additional bit specified. (i.e., if the parent's prefix is p*, the child's prefix is either p0* or p1*). Generally, the bit "0" is associated with the child created first and the path from the parent node points towards the left. Bit "1" is associated with the child created second and the path from the parent node points to the right.

Fringe nodes are nodes with no descendant. Internal nodes have 1 or 2 descendant nodes (one child associated with bit 0 and one child associated with bit 1).

The Internet has emerged as a critical communication infrastructure, carrying traffic for a wide range of important scientific, business and consumer applications. Network service providers and enterprise network operators need the ability to detect anomalous events in the network, for network management and monitoring, reliability, security and performance reasons. While some traffic anomalies are relatively benign and tolerable, others can be symptomatic of potentially serious problems such as performance bottlenecks due to flash crowds, network element failures, malicious activities such as denial of service attacks (DoS), and worm propagation. It is therefore very important to be able to detect traffic anomalies accurately and in near real-time, to enable timely initiation of appropriate mitigation steps.

The major challenges for detection of anomalies are the volume of traffic and the complicated structures of the traffic. This invention provides a method for identifying multidimensional Hierarchical Heavy Hitters. The candidate traffic is then further analyzed for abnormal behavior.

In order to assist the reader, the invention will first provide the definition of multidimensional hierarchical heavy hitters and introduce the heavy hitter detection problem.

Adopt the Cash Register Model to describe the streaming data. Let, $I=\alpha_1, \alpha_2, \alpha_3, \ldots$, be an input stream of items that arrives sequentially. Each item $\alpha_i=(k_i,u_i)$ consists of a key $k_i$, and a positive update $u_i \in \Re$. Associated with each key k is a time varying signal A[k]. The arrival of each new data item $(k_i,u_i)$ causes the underlying signal $A[k_i]$ to be updated: $A[k_i]+=u_i$.

DEFINITION 1 (HEAVY HITTER)—Given an input stream $I=\{(k_i,u_i)\}$ with total sum $SUM=\Sigma_i u_i$ and a threshold $\phi (0 \leq \phi \leq 1)$, a Heavy Hitter (HH) is a key k whose associated total value in I is no smaller than $\phi SUM$. More precisely, let $v_k=\Sigma_{i:k_i=k} u_i$ denote the total value associated with each key k in I. The set of Heavy Hitters is defined as $\{k|v_k \geq \phi SUM\}$.

The heavy hitter problem is the problem of finding all heavy hitters, and their associated values, in a data stream. For instance, if the destination IP address is the key, and the byte count is the value, then the corresponding HH problem is finding all the destination IP addresses that account for at least a proportion φ of the total traffic.

DEFINITION 2 (HIERARCHICAL HEAVY HITTER)—Let $I=\{(k_i,u_i)\}$ be an input stream whose keys $k_i$ are drawn from a hierarchical domain D of height h. For any prefix p of the domain hierarchy, let elem(D,p) be the set of elements in D that are descendents of p. Let $V(D,p)=\Sigma_k v_k: k \in elem(D,p)$ denote the total value associated with any given prefix p. The set of Hierarchical Heavy Hitters (HHH) is defined as $\{p|V(D,p) \geq \phi SUM\}$.

The hierarchical heavy hitter problem is defined as the problem of finding all hierarchical heavy hitters, and their associated values, in a data stream. If the destination IP address is used to define the hierarchical domain, then the corresponding HHH problem is defined as the problem of not only finding the destination IP addresses but also identifying all the destination prefixes that account for at least a proportion φ of the total traffic.

The invention provides a method for finding all the HH prefixes, including the descendents of p. The method can be adapted and used for more strict definition of HHH. In one embodiment, the invention uses a simpler definition to perform change detection on HHHs and avoids missing big changes buried inside the prefixes that would not be tracked under the more strict definition.

DEFINITION 3 (Multidimensional HIERARCHICAL HEAVY HITTER)—Let $D=D_1 \times \ldots \times D_n$ be the Cartesian product of n hierarchical domains $D_j$ of height $h_j$ (j=1, 2, ... n). For any $p=(p_1, p_2 \ldots, p_n) \in D$, let $elem(D, p)=elem(D_1, p_1) \times \ldots \times elem(D_n, p_n)$. Given an input stream $I=\{(k_i,u_i)\}$, where $k_i$ is drawn from D, let $V(D,p)=\Sigma_k v_k: k \in elem(D,p)$. The set of Multidimensional hierarchical Heavy Hitters is defined as $\{p|V(D,p) \geq \phi SUM\}$.

The multidimensional hierarchical heavy hitter problem is defined as the problem of finding all multidimensional hierarchical heavy hitters, and their associated values, in a data stream. As an example, define D based on source and destination IP addresses. The corresponding 2-dimensional HHH problem is to find all those source-destination prefix combinations $<p_1, p_2>$ that account for at least a proportion ø of the total traffic.

Once the multidimensional hierarchical heavy hitters have been detected in each time interval, the present invention then need to track their values across time to detect significant changes, which may indicate potential anomalies. The present invention refers to this as the change detection problem.

Our goal in this paper is to develop efficient and accurate streaming algorithms for detecting multidimensional hierarchical heavy hitters and significant changes in massive data streams that are typical of today's IP traffic.

Once the hierarchical heavy hitters have been detected in each time interval, their values are tracked across time to detect significant changes, which may indicate potential anomalies. This is referred to as the change detection problem.

The present invention discloses efficient and accurate streaming methods for detecting hierarchical heavy hitters and significant changes in massive data streams that are typical of today's IP traffic. This is accomplished by identifying all possible keys that have a volume associated with them that is greater than the heavy-hitter detection threshold at the end of the time interval. In the context of network traffic a key can be made up of fields in the packet header and it may be associated with very large ranges. For example in the case of IP prefixes the range is: $\lfloor 0,2^{32})$. Also the key may be a combination of one or more fields, which can result in significant increase in the complexity of the problem. Clearly monitoring all possible keys in the entire range can be prohibitive.

The invention provides a method that builds an adaptive data structure. The data structure dynamically adjusts the granularity of the monitoring process to ensure that the particular keys that are heavy-hitters (or more likely to be heavy-hitters) are correctly identified without wasting a lot of resources (in terms of time and space) for keys that are not heavy-hitters. The data structure resembles a decision tree that dynamically drills down and starts monitoring a node (that is associated with a key) closely only when its direct ancestor becomes sufficiently large.

The invention uses two key parameters: φ and ε. Given the total sum SUM, φSUM is the threshold for a cluster to qualify as a heavy hitter; εSUM specifies the maximum amount of inaccuracy that can be tolerated in the estimates generated by the method.

To guide the building process of the summary data structure, a threshold is used. The threshold will be referred to as the split threshold, $T_{split}$. $T_{split}$ is used to make local decisions at each step and determine when the range of keys under consideration should be looked at in a finer grain. It is chosen to ensure that the maximum amount of traffic that can be missed during the dynamic drill-down is at most εSUM for any cluster. The actual choice of $T_{split}$ depends on the method. The invention provides a method that specifies $T_{split}$ in terms of the actual total sum in a given interval. In one embodiment, the invention assumes that SUM is a pre-specified constant.

To exemplify the teachings of the invention, let the source and destination IP addresses be the dimensions for multidimensional HHH detection and let the metric to be used for detecting the heavy-hitters be the volume of traffic (e.g. number of bytes) associated with a given key. Note that the metric as well as the fields to be considered for the dimensions may be changed based on the application requirements.

Figure 2:
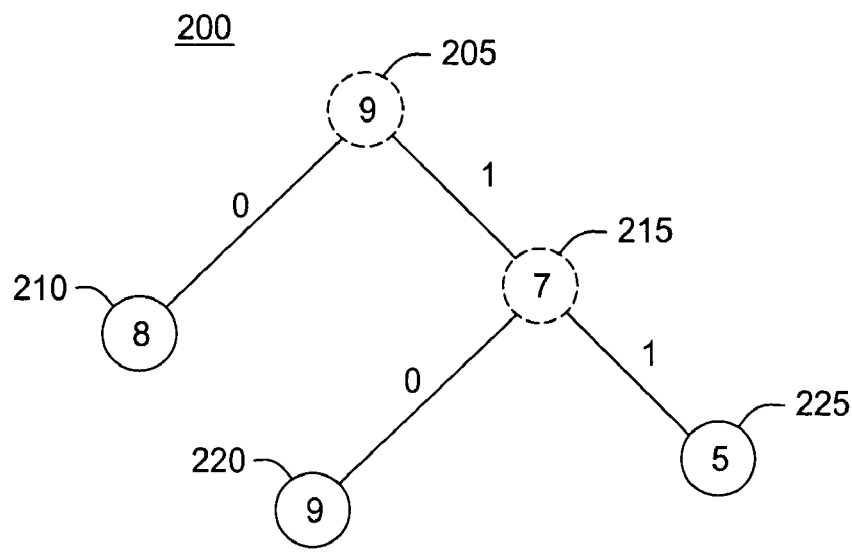
FIG. 2 illustrates an example of a trie at the arrival of a packet.

In traditional anomaly detection methods, given an n-dimensional hierarchical network, such as illustrated in FIG. 2, a scheme is used to transform the multidimensional HHH detection problem to essentially multiple non-hierarchical HH detection problems, one for each distinct combination of prefix length values across all the dimensions of the original key space.

For a n-dimensional key space with a hierarchy of height $h_i$ in the i-th dimension, there are $\pi_{i=1}^n(h_i+1)$ non-hierarchical HH detection problems, which have to be solved in tandem. Such a brute force approach needs to update the data structure for all possible combinations of prefix lengths and requires extensive resources. So, the per item update time is proportional to $\pi_{i=1}^n(h_i+1)$. Two variants of the brute force approach that differ from each other only in the method used to detect the HHs are provided for illustrative and comparative purposes. The results of the two brute force methods are referred to as Baseline Variant 1 and Baseline Variant 2 as described below:

Baseline variant 1: Sketch-based solution, (sk), which uses sketch-based probabilistic HH detection. Count-Min sketch is a probabilistic summary data structure based on random projections for a good overview of sketch and specific sketch operations. Let [m] denote set $\{0, 1 \ldots, m-1\}$. A sketch S consists of an H×K table of registers: $T_S[i,j]$ ($i \in [H], j \in [K]$). Each row $T_S[i,\cdot]$ ($i \in [H]$) is associated with a hash function $h_i$ that maps the original key space to [K]. The data structure can be view as an array of hash tables. Given a key, the sketch allows one to reconstruct the value associated with it, with probabilistic bounds on the reconstruction accuracy. The achievable accuracy is a function of both the number of hash functions (H), and the size of hash tables (K). This method uses a separate sketch data structure per distinct prefix length combination in all the dimensions.

Baseline variant 2: Lossy Counting-based solution (Ic), which uses a deterministic single-pass, sampling-based HH detection method called Lossy Counting. Lossy Counting uses two parameters: ε and φ, where $0 \leq \epsilon << \phi \leq 1$. At any instant, let N be the total number of items in the input data stream. Lossy Counting can correctly identify all heavy-hitter keys whose frequencies exceed φN. Ic provides lower and upper bounds on the count associated with a heavy hitter. The gap between the two bounds is guaranteed to be at most εN. The space overhead for the method is $$O\left(\frac{1}{\epsilon}\log(\epsilon N)\right).$$

The Lossy Counting method can be modified to work with byte data instead of count data. All the complexity and accuracy results still apply except that N is replaced by SUM. This adapted version is used by the current invention for evaluation. In the worst-case scenario, the performance of the Ic is an indicative for the worst-case performance of any other methods based on Lossy Counting.

Unlike the brute force methods, the current invention utilized an Adaptive Decision Tree (ADT) to identify the source and destination prefixes (used for IP as the keys) that are responsible for an amount of traffic that exceeds a given threshold. The invention provides a method to identify the prefixes associated with the multidimensional heavy hitters while maintaining minimal state data and performing a minimum number of update operations for each arriving flow of traffic or packet.

The hierarchical nature of the problem is similar to the classical IP lookup problem in which for every received packet the IP destination field in the packet header is used to search for a longest matching prefix in a set of given IP prefixes (also known as a routing table). The difference between the current problem and the IP lookup problem is that in the IP lookup problem case the set of prefixes is given as an input and is often static. In contrast, the current method needs to generate the set of prefixes that are associated with the multidimensional heavy hitters dynamically, based on the packet arrival pattern.

The multidimensional nature is also similar to packet classification problems. Source and destination IP addresses, port addresses and protocols are typical dimensions for packet applications. Cross-producting techniques are typically used to deal with the multidimensional nature of problems for packet classification.

The current invention utilizes an ADT for the dynamic case to adapt the methods that have been used for the static IP lookup problem. It also adapts the cross-producting technique for detection of multidimensional HHH.

In order to illustrate the teachings of the present method, the 1-d HHH detection problem is first considered.

FIG. 2 illustrates the one-bit trie data structure at the time of a packet arrival. A standard trie data structure starts with a single node trie that is associated with the zero-length prefix. Each node in a one-bit trie has at most two child nodes, one associated with bit 0 and the other with bit 1. The path directed towards the child associated with bit 0 is generally directed to the left of the parent node. The path directed to the right of the parent node is associated with bit 1.

The trie data structure and the present invention are extendable to m-bits. For an m-bit tries, each node of the trie has $2^m$ children, similar to the idea of the multi-bit tries used for IP lookup problems. However for simplicity the present invention is described using one-bit tries.

FIG. 2 illustrates an example of a trie 200 at the arrival of a packet. To illustrate, dotted circles 205 and 215 represent internal nodes. Solid circles 210, 220 and 225 represent fringe nodes. The links to the child nodes associated with bit 0 are 210 and 220. The links to the child nodes associated with bit 1 are 215 and 225. For example, the addressing for node 225 would start with 11 and the addressing for node 220 would start with 10. The volumes for all the nodes are shown inside of the circles.

The present invention maintains a standard trie data structure that starts with a node that is associated with a zero-length prefix. The volume field associated with that node is incremented with the size of each arriving packet. When the value in this field exceeds $T_{split}$, the node is marked as internal and a new child node associated with the prefix 0* or 1* that the incoming packet matches is created. The size of the current packet is then used to initialize the volume field in the newly created child node. The structure develops dynamically with the arrival of each new packet. The implementation also includes some special handling when the bottom of the trie is reached (i.e. when all bits in the key are used). In one illustrative example, the update operation is illustrated for a trie with $T_{split}$ set to 10.

Figure 3:
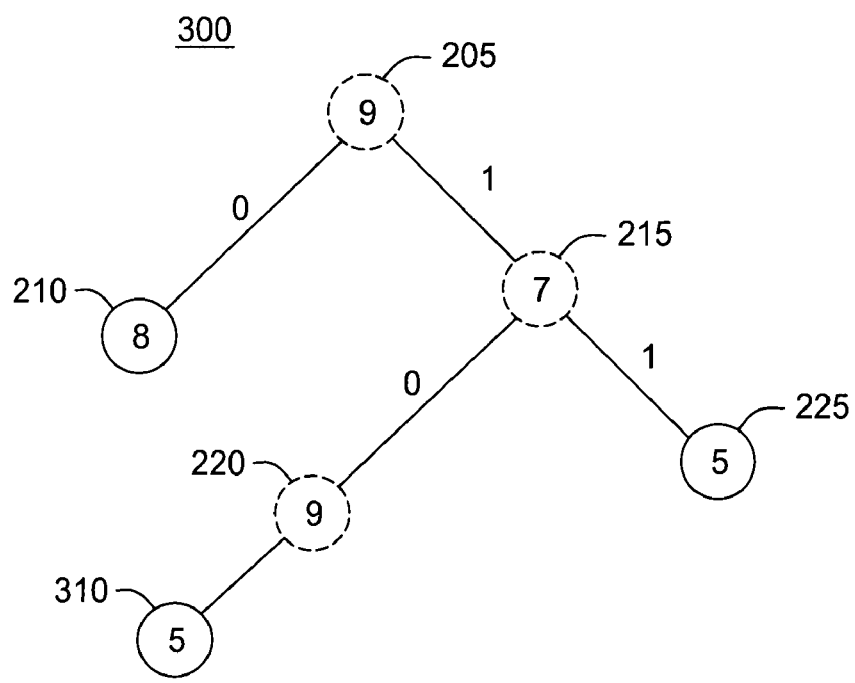
FIG. 3 illustrates the trie of FIG. 2 after update for the packet.

FIG. 3 shows the trie after an update operation is completed. To illustrate, the arriving packet has a Destination IP prefix of 100* and a size of 5 bytes. The method first performs a longest matching prefix operation on the trie and arrives at the node associated with prefix 10*. Adding 5 bytes to the volume field of this node would make its value exceed $T_{split}$. Therefore, the method creates a new node associated with prefix 100* (i.e., the child node associated with bit 0). The size of the current packet is used to initialize the volume field of the newly created node. After the update, the fringe node 220 in FIG. 2 becomes an internal node 112. The new child (fringe) node 310 is indicated in FIG. 3.

As illustrated, the invention's trie construction process guarantees that the value of the volume field in any internal node to always be less than $T_{split}$. As a result, $T_{split}$ is set such that $T_{split}=\epsilon SUM/W$ and the maximum amount of traffic missed as the method dynamically drills down to the fringe is set to be at most $\epsilon SUM$.

The time complexity of the operations described above is on the same order of magnitude as a regular IP lookup operation. For every packet arrival, at most one node in the trie is updated. At most one new node is created during each update as long as the volume for the new item is below $T_{split}$ (in case the volume exceeds $T_{split}$, an entire new branch all the way to the maximum depth W is created). At each depth, there can be no more than $SUM/T_{split}=W/\epsilon$ internal nodes (otherwise the total sum over all the subtries rooted at those nodes would exceed SUM, which is impossible). So the worst-case memory requirement of the data structure is $O(W^2/\epsilon)$.

As illustrated in FIGS. 2 and 3, every packet arrival results in at most one update. The update occurs at the node which is the most specific node representing the destination IP prefix (of the packet) at the time of the packet arrival. Therefore the volumes of the internal nodes need to be reconstructed at the end of the time interval. By delaying the reconstruction process to the end of the time interval, the reconstruction cost is amortized across the entire time interval. To compute the volumes associated with all the internal nodes, a recursive post-order traversal of the trie is performed. In each recursive step the volume of the current node is computed as being the sum of the volume represented in the current trie node and its child nodes.

Note that because of utilizing $T_{split}$ to guide the trie construction process, the volumes represented in the internal nodes even after reconstruction are not entirely accurate. In order to more accurately estimate the volume associated with a given node, an estimate of the missed traffic for that node needs to be included. Below three ways of estimating the missed traffic are considered:

Copy-all: the missed traffic for a node N is estimated as the sum of the total traffic seen by the ancestors of node N in the path from node N to the root of the tree. Note that copy-all is conservative in that it copies the traffic trapped at a node to all its descendents. It always gives an upper bound for the missed traffic. Since the update operation maintains the invariant that every internal node N has volume below $T_{split}$, the estimate given by the copy-all rule is further upper bounded by the product of the depth of the node and $T_{split}$.

No-copy: this is the other extreme that optimistically assumes the amount of missed traffic to be 0.

Splitting: the total contribution of missed traffic by a node N is split among all its children C in proportion to the total traffic for C. Essentially what this assumes is that the traffic pattern before and after the creation of a node are very similar, so missed traffic is predicted by proportionally splitting the traffic trapped at a node to all its children.

Both the copy-all and the splitting rule can be easily implemented by traversing the trie in a top-down fashion.

Once the estimate for the missed traffic is available, it is combined with the total amount of observed traffic and the resulting sum is used as an input for the HHH detection. The accuracy will depend on the method selected.

In one embodiment, the present invention provides a method for handling the 2-dimensional HHH problem by adapting the cross-producting techniques. The high level concept is to execute the 1-dimensional method for each of the dimensions (IP destination, and IP source) and to use the length associated with the longest matching prefix nodes in each of the dimensions as an index into a data-structure that holds the volume data for the 2-dimensional HHHs.

In one embodiment, the present invention maintains three data structures. Two tries are used to keep track of the 1-dimensional information. An array H of hash tables of size W×W is used to keep track of the 2-dimensional tuples. A tuple $(p_1,p_2)$ comprises of the longest matching prefix in both the dimensions. The array is indexed by the lengths of the prefixes $p_1$ and $p_2$. For example, in the case of IPv4 prefixes with a 1-bit trie-based solution, W=32.

For every incoming packet the individual 1-dimensional tries are updated, which return the longest matching prefix in each of the dimensions. This yields two prefixes $p_1$ and $p_2$ with lengths $l_1$ and $l_2$, respectively. Next the two lengths are used as an index to identify the hash table $H[l_1][l_2]$. $<p_1,p_2>$ is then used as a lookup key in the hash table $H[l_1][l_2]$. Subsequently, the volume field of the entry associated with the key is incremented. This process is repeated for every arriving packet.

For every packet three update operations are performed, one operation in each of the two 1-dimensional tries, and one operation in at most one of the hash-tables. This results in a very fast method. The memory requirement in the worst case is $O((W^2/\epsilon)^2)=O(W^4/\epsilon^2)$, due to the use of cross-producting. But in practice, we expect the actual memory requirement to be much lower.

The next step is to reconstruct the volumes for the 2-d internal nodes. To compute the total volume for the internal nodes, the volume for each element in the hash tables is added to all its ancestors. This can be implemented by scanning all the hash elements twice. During the first pass, for every entry e represented by key $<p_1,p_2>$ (where $p_1$ and $p_2$ represent prefixes) and with prefix lengths $<l_1,l_2>$ the method adds the volume associated with e to its left parent in the hash-map represented by key $<ancenstor(p_1),p_2>$ and lengths $<l_1-1,l_2>$. Note that the process starts from entries with the largest $l_1$ and end with entries with the smallest $l_1$. Then in the second pass, the method adds the volume to right parent represented by the key <$p_1$,ancenstor($p_2$)> and lengths <$l_1,l_2-1$>. This time the process starts from entries with the largest $l_2$ and end with entries with the smallest $l_2$.

As in the case of the 1-d, the next step is to estimate the missed traffic for each node. For each key (recall that the key is made up of the destination prefix and the source prefix) in the hash table the method traverses the individual tries to find the prefix represented by the key and returns the missed traffic estimate obtained from the node (by applying either the copy-all, or the splitting rule as described in Section). The missed traffic is then estimated as the maximum of the two estimates returned by the two 1-d tries. Using the maximum preserves the conservativeness of copy-all.

The scheme using the Cross-Producting technique is very efficient in time, however it can be potentially memory intensive in the worst case. The present invention overcomes this drawback by adapting two other methods for two-dimensional packet classification to this problem: Grid-of-Tries and Rectangle Search.

The first method is the Grid-of-Tries and Rectangle Search. Just like Cross-Producting, both Grid-of-Tries and Rectangle Search have been applied in the packet classification context. Conceptually, each node can be viewed as a rule, then finding nodes on the fringe becomes a packet classification problem.

However most packet classification methods are optimized for a relatively static rule set (through pre-computation), whereas in the context of detection of HHH, there may be a need to dynamically maintain the fringe set. This may involve updating n nodes and possibly creating n new nodes. Despite the clear difference, both the Grid-of-Tries and Rectangle Search methods are adapted to solve the current problem. An illustration is provided here only to show the basic idea and highlight the main difference.

Figure 4:
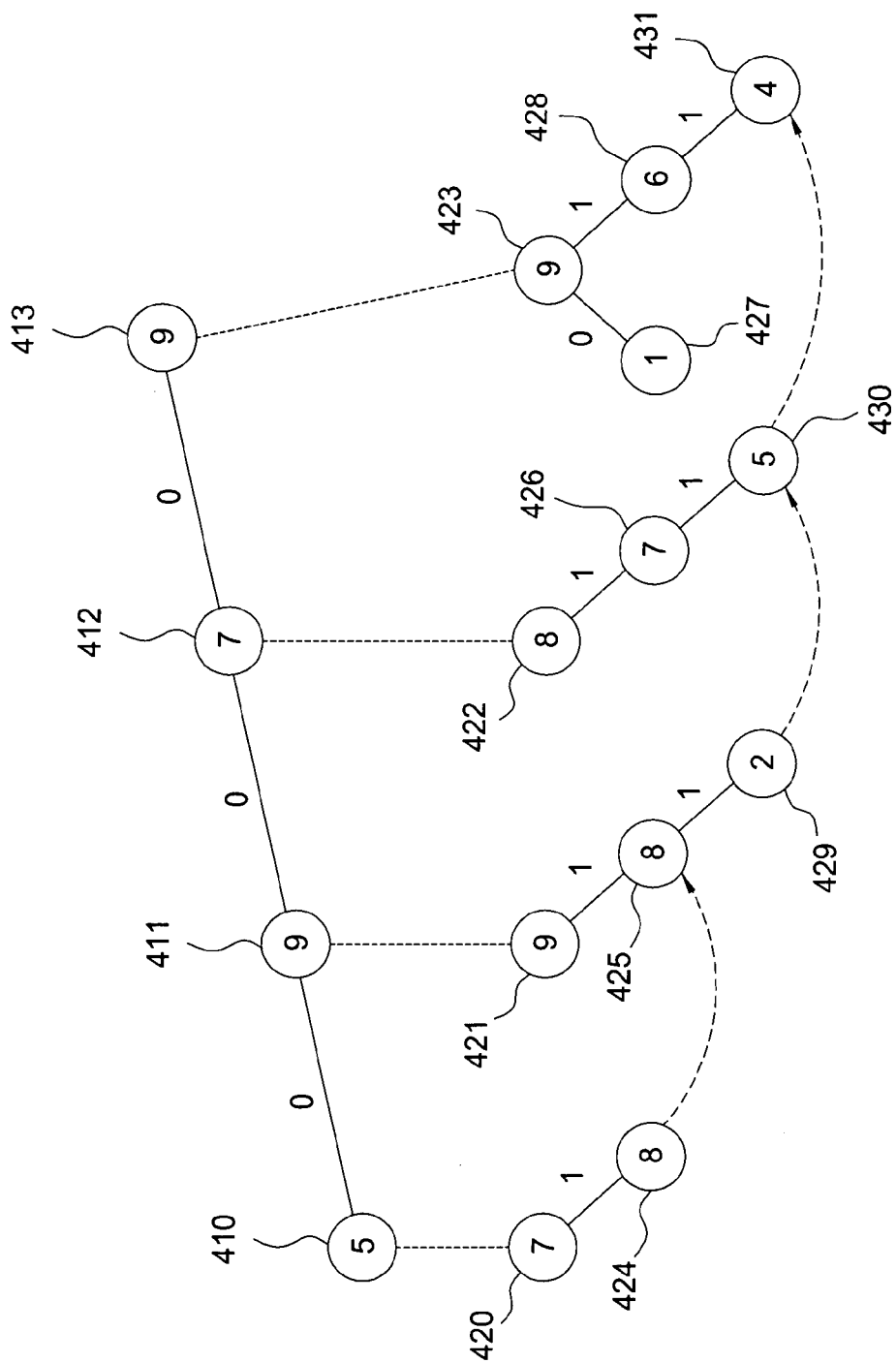
FIG. 4 illustrates an example of a grid-of-trie data structure at the time of a packet arrival.
Figure 5:
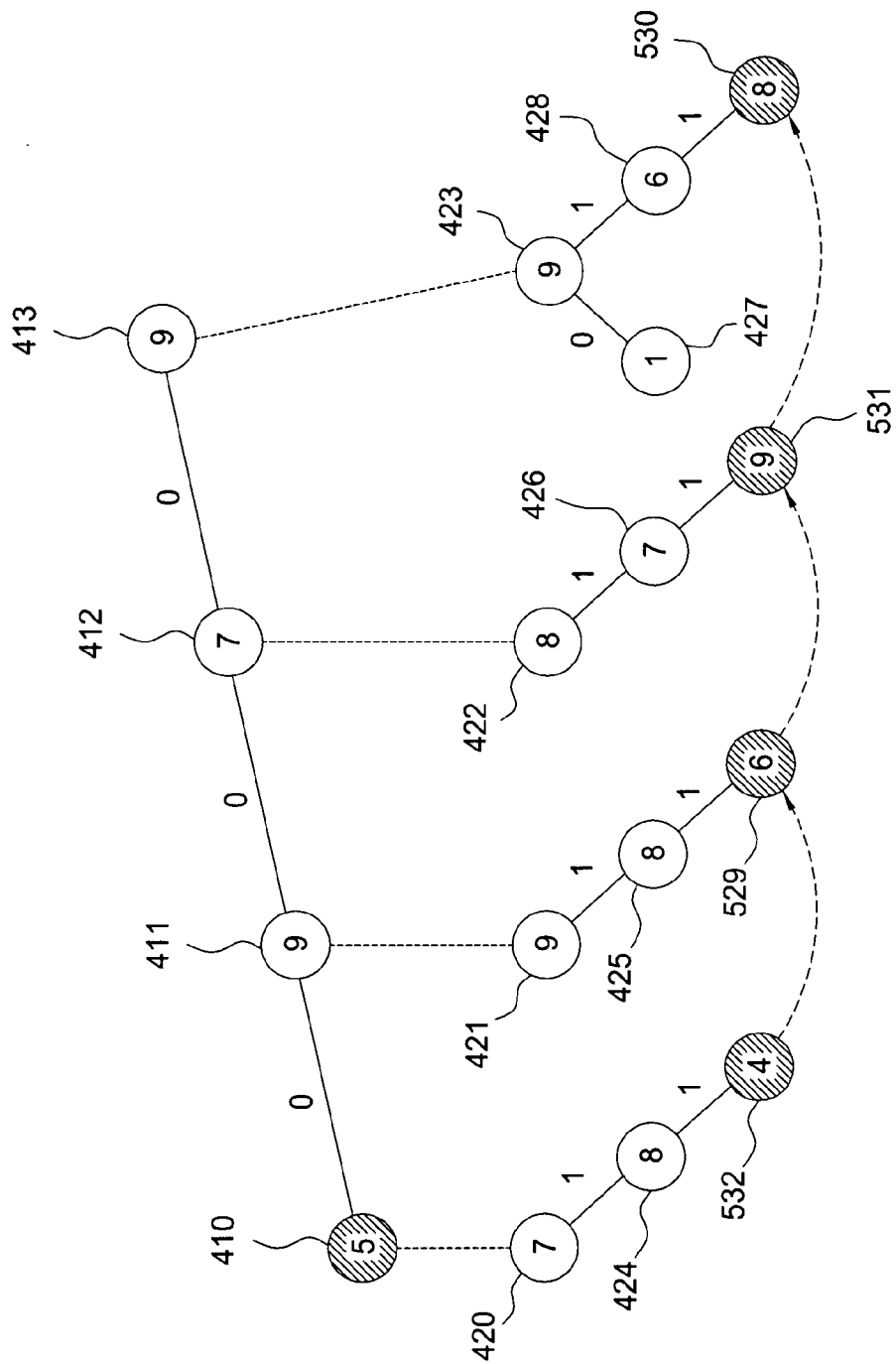
FIG. 5 illustrates the grid-of-trie of FIG. 4 after the update operation.

FIGS. 4 and 5 illustrate an exemplary grid-of-tries data structure. The grid-of-tries data structure contains two levels of tries. The first level is associated with the IP destination prefixes in the classifier (a predefined rule set) while the second level tries are associated with IP source prefixes in the classifier.

For every valid prefix ($P_1$) node in the first level trie there is a pointer to a second level trie. The second level trie is created using all the prefixes ($P_2$) for which there is a rule $P_1, P_2$ in the classifier. As in the 1-dimensional HHH detection case, the grid-of-tries data structure is dynamically built based on the packet arrival pattern.

In order to constructing the grid-of-tries for 2-d HHH detection, each node in the data structure contains a pointer to each of its children. In addition each node in the first-level trie maintains a pointer to a second-level trie and each node in the second-level trie maintains a jump pointer for fast trie traversal. Note that there is only one first-level trie, but multiple second-level tries. Specifically, there is a second-level trie for each node in the first-level trie. Each node also stores a volume field associated with the volume of traffic that corresponds to all the packets having a prefix equal with the prefix of the node from the moment that the node is created till the moment when new child nodes are associated with the node.

If the existence of a current grid-of-tries structure is assumed at the given moment, new nodes and tries may be appended to the current grid-of-tries with the arrival of a new packet. First, a Longest Matching Prefix (LMP) operation is executed in the first-level trie (using the destination prefix). A fringe node is always identified. Then same as in the case of the 1-dimensional trie method, if the volume associated with this node becomes greater than $T_{split}$ then a new child node is created and associated with this node. As in the 1-d method, the size of the current packet is used to initialize the volume field for the newly created child node. In addition to adding child nodes in the first-level trie, in the 2-d method the method must also initialize and associate a new second-level trie with each one of these newly created children. These second-level tries when first created are only initialized with a root node. The size of the current packet is used to increment the volume associated with the second-level trie that is associated with the new LMP in the first-level trie.

The arrival of a packet may also result in a situation where the node represented by the LMP in the second-level trie exceeds $T_{split}$. In this case a new child is created and associated with this node in the second-level trie in a way similar to the 1-dimensional HHH detection node creation process.

Every packet that arrives may contribute to multiple updates in the volume field of the nodes in the second dimension tries. To illustrate the update process consider the example in FIG. 4, and the arrival of a packet with destination IP prefix 000*, and source IP prefix 111* with a size of 4 bytes. $T_{spit}$ is set to 10 for this illustration.

FIG. 4 represents the grid-of-tries data structure at the time of the packet arrival. Nodes 410, 411, 412 and 413 are in the first level trie. Nodes 420, 421, 422 and 423 are in the second level trie. A second-level trie is associated (connected by dotted lines in the figure) with each node in the first level trie. The dashed lines represent jump pointers (which are always between nodes with the same source prefix).

The grid-of-trie data structure after the update operation is illustrated in FIG. 5. The nodes to which we add the size of the current packet are shown in grey. The dashed lines represent jump pointers (which are always between nodes with the same source prefix). The dashed lines in FIGS. 4 and 5 represent jump pointers.

For the moment ignore the dotted lines in the figure. This arriving packet contributes to a modification in the value of the volume field in each one of the second-dimension tries associated with the LMP node in the first-dimension and all ancestors of this LMP node. The nodes that are affected by the update are shown in gray. To walk through the process, first an LMP operation was done in the first-level trie using the first prefix 000*, and the value of the volume field associated with this LMP node is incremented. The next step is to follow the pointer to the second-level trie. Again the method does an LMP operation in the second-level trie using the second prefix 111*. The search terminates with the node for prefix 1*. If add the size of the current packet was to be added to the volume associated with this node it would increase beyond $T_{split}$. Therefore new child node is created for this node. The size of the current packet is used to initialize the volume associated with the new child node for prefix 11* as this new node now represents the LMP. The method must also update the second level tries associated with all the less specific prefixes of 000* namely 00, 0* and *.

In order to provide a fast update operation, each fringe node in the second-level trie contains a pre-computed jump pointer. Each fringe node in a second-level trie $T_1$ for prefix $P_2$ originating at prefix $P_1$ in the first-level trie maintains a jump pointer to the same prefix $P_2$ in a second-level trie that is associated with the direct ancestor of P. Note that the jump pointer discussed here can be maintained dynamically—whenever a node in the second-level trie associated with $P_1$ is created, a node for the second-level trie associated with the direct ancestor of $P_1$ (if not already present) is also created. Utilizing jump pointers keeps the time complexity within O(W) as during the update process the method can avoid having to restart the longest prefix matching problem at the root of every second-level trie (recall that the method needs to update every second-level trie associated with all ancestors of the longest matching prefix node in the path between the node and the root of the first-level trie).

To ensure that the method only misses εSUM traffic in the worst case, the method also sets $T_{split}=\varepsilon SUM/(2W)$. The space requirement is $O(W^2 \cdot (2W)/\varepsilon) = O(2W^3/\varepsilon)$.

The rectangular search is another method provided by the current invention to detect multidimensional HHHs. FIG. 6 illustrates the rectangular data structure before an update.

Conceptually, Rectangle Search does exactly the same thing as Grid-of-Tries—updating all the elements on the fringe and expanding it whenever necessary. The major difference lies in how the method locates all the elements on the fringe. Grid-of-Tries does so using jump pointers. In the worst case, it requires 3W memory accesses, where W is the width of the key. Rectangle Search uses hash tables instead and requires 2W (hashed) memory accesses in the worst case. The fringe nodes are in dark shade, and the internal nodes are in light shade. When a new tuple <k1,k2> (with value v) arrives, the process starts from the bottom left corner and moves towards the upper right corner. $T_{split}$ is set to 10. So a new element gets created.

The basic data structure for Rectangle Search is a set of hash tables arranged into a 2-dimensional array. More specifically, for each destination prefix length $l_1$ and source prefix length $l_2$, there is an associated hash table $H[l_1][l_2]$. Initially only H[0][0] contains an element <*,*> with volume 0.

Figure 8:
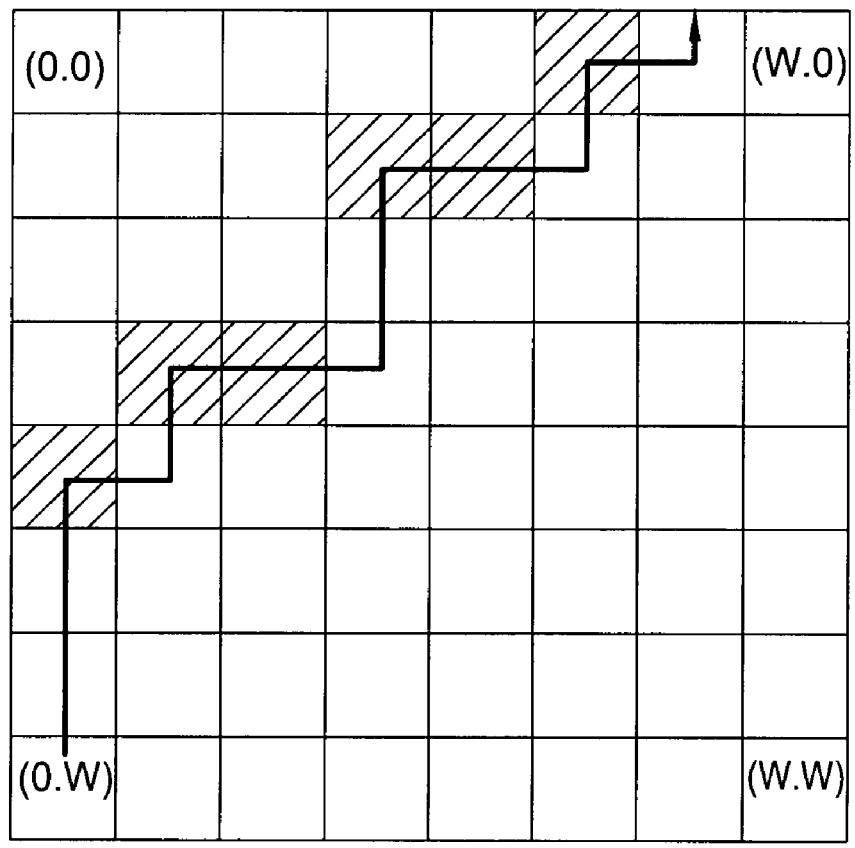
FIG. 8 illustrates the movement for the rectangular search operation.

The update operation for a new tuple <$k_1,k_2$> (with value v) is illustrated in FIGS. 6, 7 and 8. First consider the case when v is below $T_{split}$, which is the common case as the total number of elements above $T_{split}$ is limited. The method starts with $(l_1,l_2)=(0,W)$ (the lower left corner in FIG. 8). During each step, the method checks if tuple <$p_1,p_2$> belongs to the hash table $H[l_1][l_2]$, where $p_i=prefix(k_i,l_i)$. If <$p_1,p_2$> does not exist in $H[l_1][l_2]$, the method simply decrements $l_2$ by 1 (i.e., move upwards in FIG. 8) and continue. Otherwise, the method found an element e. If e is a fringe node and its volume+v is below $T_{split}$, then simply add v to the volume of e. Otherwise, either e is already an internal node (when updating some other descendents of e) or should become one after this update. In either case, a new element is created with key <$p_1$,prefix($k_2,l_2+1$)> and value v and it is inserted into $H[l_1][l_2+1]$. In case $l_2=0$ and e becomes a new internal node, then expand the fringe towards the right by creating an element with the key <prefix($k_1,l_1+1$),$p_2$> and inserting it into $H[l_1+1][l_2]$. The next step is to increment $l_1$ by 1 and continue (i.e., move towards right in FIG. 8). The method terminates whenever either $l_1>W$ or $l_2<0$. Since during each step either the method increments $l_1$ by one or decrements $l_2$ by one, the method takes at most 2W−1 steps to terminate.

When v is above $T_{split}$, the steps are virtually identical, except that for each $l_1$, the method needs to insert one element with value 0 into each hash table $H[l_1+1][j](l_2<j<W)$ and then one element with value v into hash table $H[l_1][W]$. In the worst case, this may create $(W+1)^2$ new elements. But since the number of elements above $T_{split}$ is small below SUM/$T_{split}$, the amortized cost is quite low.

Just like Grid-of-Tries, Rectangle Search requires $O(2W^3/\varepsilon)$ space to guarantee an error bound of εSUM.

In all the methods described so far, whenever the method receives an item <$k_1,k_2$> with value v above $T_{split}$, it creates state for all its ancestors <$p_1,p_2$> if they do not already exist. Such express expansion of the fringe has the advantage that it leads to less missed traffic for the fringe nodes and thus higher accuracy. However, it also requires a lot of space, especially when $T_{split}$ is very small and there are a large number of items with value above it (this can happen, for instance, when the maximum depth of the trie is large). The invention introduces a simple technique, lazy expansion, to significantly reduce the space requirement.

The basic idea for lazy expansion is very simple. Whenever a large item with value v satisfying $v/T_{split}\in[k-1,k]$ is received, it is split into k smaller items, each with value $v/k<T_{split}$ and perform k separate updates. Since each item is below $T_{split}$, it will lead to the creation of no more than W elements. So long as k<W, the invention guarantees to reduce space requirement while still achieving the same deterministic worst-case accuracy guarantee. Meanwhile, the method can modify the update operation to batch k updates together (by taking into account the multiplicities of the item). This avoids any increase in the update cost.

So far all our methods assume a fixed value for SUM. For many online applications, however, it may be desirable to set the threshold as a fraction of the actual total traffic volume for the current interval, which is not known until all the traffic is seen. In one embodiment, the invention has a strategy to first use a small threshold derived based on some conservative estimate of the total traffic (i.e., a lower bound), and increase the threshold when a large amount of additional traffic is seen. Note that as the threshold is increased, all the nodes that should no longer exist under the new threshold are removed. The method refers to this as the "compression" operation.

The invention maintains a lower bound and an upper bound of the actual sum (SUM). Whenever the actual sum exceeds the upper bound, it performs the compression operation and then doubles the upper bound. The compression operation simply walks through the trie in a top down manner and removes the descendents of all the fringe nodes (according to the new threshold). The compression methods are more involved in 2-d case, but the high-level idea is applicable. We make the following observations:

In the worst case, compression can double the space requirement. It also adds some computational overhead. But the number of compression operations only grows logarithmically with the value of SUM. In practice, a reasonable prediction of the actual sum based on past history can be obtained. So typically a very small number of compressions is needed.

Compression can potentially provide a better accuracy bound. In particular, a node can potentially get created sooner than with a larger threshold, so the amount of missed traffic can be lower (but in the worst case, the accuracy guarantee still remains the same).

Compression also makes it possible to aggregate multiple data summaries (possibly for different data sources or created at different times or locations). For example, in the 1-d case, to merge two tries, the method just needs to insert every node in the second trie into the first trie, update the total sum and detection threshold, and then perform the compression operation (using the new detection threshold). Such aggregation capability can be very useful for applications like detecting distributed denial-of-service attacks.

In one embodiment, the present invention discloses a 5-d HHH detection for network anomaly detection. In this example, Rectangle Search and Grid-of-Tries can be used as building blocks to solve the general n-dimensional HHH detection problem and always result in a factor of W improvement over the brute-force approach. However, this may still be too slow for some applications.

Fortunately, for many practical applications, the general HHH detection in all the fields is not needed. In the 5-d HHH context, the invention needs to handle 5 fields: (source IP, destination IP, source port, destination port, protocol). For protocol an exact match is typically required (TCP, UDP, ICMP, others). For source or destination port, the method can construct some very fat and shallow trees. For instance, it can use a 3-level tree, with level 0 being * (i.e., don't care), level 1 being the application class (Web, chat, news, P2P, etc.), and level 2 being the actual port number. In addition, it typically only needs to match on one of the port numbers (instead of their combination). Finally, it typically only cares about port numbers for TCP and UDP protocols. Putting all these together, it often suffices to just consider a few combinations in the context of network anomaly detection. For each combination, an array of grid-of-tries has to be updated.

In the context of network applications one often needs to deal with tens of millions of network time series and it is infeasible to apply standard techniques on per time series basis. Others have used Sketch-based change detection but it works very well when there is only a single fixed aggregation level. If it is applied to find changes at all possible aggregation levels, the method must take a brute-force approach and run one instance of sketch-based change detection for every possible aggregation level, which can be prohibitive.

The current invention provides a method to perform scalable change detection for all possible aggregation levels by using the HHH detection method as a pre-filtering mechanism. The basic idea is to extract all the HHH traffic clusters using a small HHH threshold $\phi$ in our HHH detection methods, reconstruct time series for each individual HHH traffic cluster, and then perform change detection for each reconstructed time series. Intuitively, if a cluster never has much traffic, then it is impossible to experience any significant (absolute) changes. The method captures most big changes so long as the HHH threshold $\phi$ is sufficiently small.

A major issue the invention addresses is how to deal with the reconstruction errors introduced by the summary data structure. The picture is further complicated by the increasing use of sampling in network measurements, which introduces sampling errors to the input stream. Lack of effective mechanisms to accommodate such errors can easily lead to false alarms (i.e., detection of spurious changes). The current change detection method can accommodate both types of errors in a unified framework. It is quite general and can be applied to any linear forecast model.

Clearly, it is prohibitive to keep state for all possible clusters. One possible solution is to start per-cluster monitoring after a cluster becomes a heavy hitter (with sufficiently small filtering threshold). This approach has been used in a different context for accounting purposes. This present invention uses an alternative approach, which is to reconstruct values from the data summaries and perform change detection from such reconstructed time series. One advantage of this approach is that the method can potentially perform change detection on (either spatially or temporally) aggregated data summaries. For example, in a distributed environment, it can combine data summaries for traffic at different locations and then perform change detection on the aggregated data. Such capability can be potentially very useful for detecting anomalies like distributed denial-of-service (DDoS) attacks. It can be difficult for the per-cluster monitoring approach to achieve the same effect as a cluster may be a heavy hitter in some locations but not the others.

The current invention addresses the following major issues in detecting changes using the summary structure. The techniques are very general and can be easily applied to any linear forecast model.

Extracting the time series is the first step for time series analysis. In this context, a cluster may not appear in all summary data structures all the time.

The summary data structure introduces uncertainty in that the true volume for a cluster may lie anywhere between the lower bound and the upper bound that are obtained from the data summary. Such uncertainty may further accumulate during forecasting. The method needs to quantify the cumulative level of uncertainty in order to accommodate it in the detection criteria.

Sampling is increasingly used in network measurement and introduces errors in the input data stream. The present invention provides an analysis framework that is flexible enough to accommodate such errors.

Below the method provided by the invention is presented in the context of one specific change detection method: Holt-Winters, which has been successfully applied in the past for anomaly detection. Given a time series, the forecast model maintains a separate smoothing baseline component and a linear trend component. Big changes can be detected by looking for data points that significantly deviate from the forecast. For online change detection, it is common to maintain an exponentially weighted moving average.

Given a traffic cluster in an interval, the summary data structure produces three different values by using different rules to calculate the amount of missed traffic: a lower bound using the no-copy rule, an upper bound using the copy-all rule, and an estimate using the splitting rule. The splitting rule often gives the most accurate estimate. Therefore, the method uses time series splitting rule as the input for the Holt-Winters forecast model to obtain estimates for the true forecast errors and detection thresholds. It also uses the no-copy and copy-all rules to obtain tight bounds on the true forecast errors.

One issue is the presence of missing clusters. A cluster may not appear in the summary structure for every interval. When this happens, the method still has to estimate its associated traffic volume, otherwise there will be a gap in the reconstructed time series. Fortunately, the summary structure allows it to conveniently obtain such estimates. For example, given a 2-d missing cluster with key $<p_1,p_2>$, conceptually all it needs to do is to insert a new element with key $<p_1,p_2>$ and value 0 into the summary data structure, which will result in one or more newly created fringe nodes. The method can then obtain estimates for the first newly created fringe node and use them as the corresponding estimates for $<p_1,p_2>$. After this, it can then remove all the newly created nodes through compression. Note that in the final implementation, the method does not need to actually create the new fringe nodes and then remove them—it just need to do a lookup to find the first insertion position.

At the first glance, one might compute the baseline and linear trend components recursively to obtain bounds on the forecast error. Unfortunately, reconstruction errors can accumulate exponentially with this approach and cause the bounds to be too loose to be useful. In one embodiment, the present invention obtains tight bounds by directly representing the baseline and linear trend components as linear combinations of the true traffic volume and then incorporating the bounds. Thus, the solution ignores the remote past as it has very little effect on predicting the future. The method needs to keep the state for the most recent few intervals for each flow.

In one embodiment, the present invention discloses a method for obtaining bounds on forecast errors. Let the use of superscript $^L$ and $^U$ on a variable denote the lower and upper bounds for the variable, respectively. For example, $X_i^L$ denotes the lower bound for $X_i$. Below the present invention shows how to compute $E_i^L$ and $E_i^U$ the bounds for the true forecast errors $E_i$.

A naïve solution: At the first glance, it seems rather straightforward to compute $E_i^L$ and $E_i^U$—we can directly recursively compute bounds for $S_i, T_i$ and then use them to form bounds for $F_i$ and $E_i$. More specifically, we have $$S_i^U = \alpha X_{i-1}^U + (1-\alpha)(S_{i-1}^U + T_{i-1}^U)$$

$$S_i^L = \alpha X_{i-1}^L + (1-\alpha)(S_{i-1}^L + T_{i-1}^L)$$

$$T_i^U = \beta(S_i^U - S_{i-1}^L) + (1-\beta)T_{i-1}^U$$

$$T_i^L = \beta(S_i^L - S_{i-1}^U) + (1-\beta)T_{i-1}^L$$

$$F_i^U = S_i^L + T_i^L \; F_i^L = S_i^U + T_i^U$$

$$E_i^U = X_i^U - F_i^L \; E_i^L = X_i^L - F_i^U$$

Unfortunately, reconstruction errors can accumulate exponentially with this approach and cause the resulted bounds $E_i^L$ and $E_i^U$ to be too loose to be useful. The forecast error bounds produced by the naïve solution can be shown when $X_i^L = 0$ and $X_i^U = 1$.

In one embodiment, the present invention can obtain tight bounds by directly representing $S_i$ and $T_i$ as linear combinations of $X_j$ ($j \leq i$) and then incorporating the bounds $X_j^L$ and $X_j^U$. More specifically, let $S_i = \sum_{j=1}^{i-1} s[i,j] X_j$ and $T_i = \sum_{j=1}^{i-1} t[i,j] X_j$. We can compute $s[i,j]$ and $t[i,j]$ recursively as follows:

$$s[i, j] = \begin{cases} a & j = i-1 \\ (1-a)(s[i-1, j] + t[i-1, j]) & j < i-1 \end{cases}$$

$$t[i, j] = \beta(s[i, j] - s[i-1, j]) + (1-\beta)t[i-1, j]$$

We can prove by induction that $s[i, j] = s[i-1, j-1]$ and $t[i, j] = t[i-1, j-1]$ for $\forall_j > 2$ (proof omitted for the interest of brevity). So when we increment i, we only need to compute $s[i, j]$ and $t[i, j]$ for $j \leq 2$. Once we have $s[i, j]$ and $t[i, j]$, let $f[i, j] = s[i, j] + t[i, j]$. We then compute the forecast error bounds $E_i^L$ and $E_i^U$ as $$E_i^U = X_i^U - \sum_{j: f[i,j]>0} f[i, j] \cdot X_j^L - \sum_{j: f[i,j]<0} f[i, j] \cdot X_j^U$$

$$E_i^L = X_i^L - \sum_{j: f[i,j]>0} f[i, j] \cdot X_j^U - \sum_{j: f[i,j]<0} f[i, j] \cdot X_j^L$$

The present solution yields very tight bounds.

Note that the above solution requires keeping the entire interval series $[X_i^L, X_i^U]$. Our solution is simply to ignore the remote past. This is reasonable as the use of exponential smoothing means the remote past has very little effect on predicting the future. That is, $f[i, j]$ becomes very small when $i-j$ is sufficiently large. As a result, we only need to keep state for the most recent few intervals for each flow.

Figure 9:
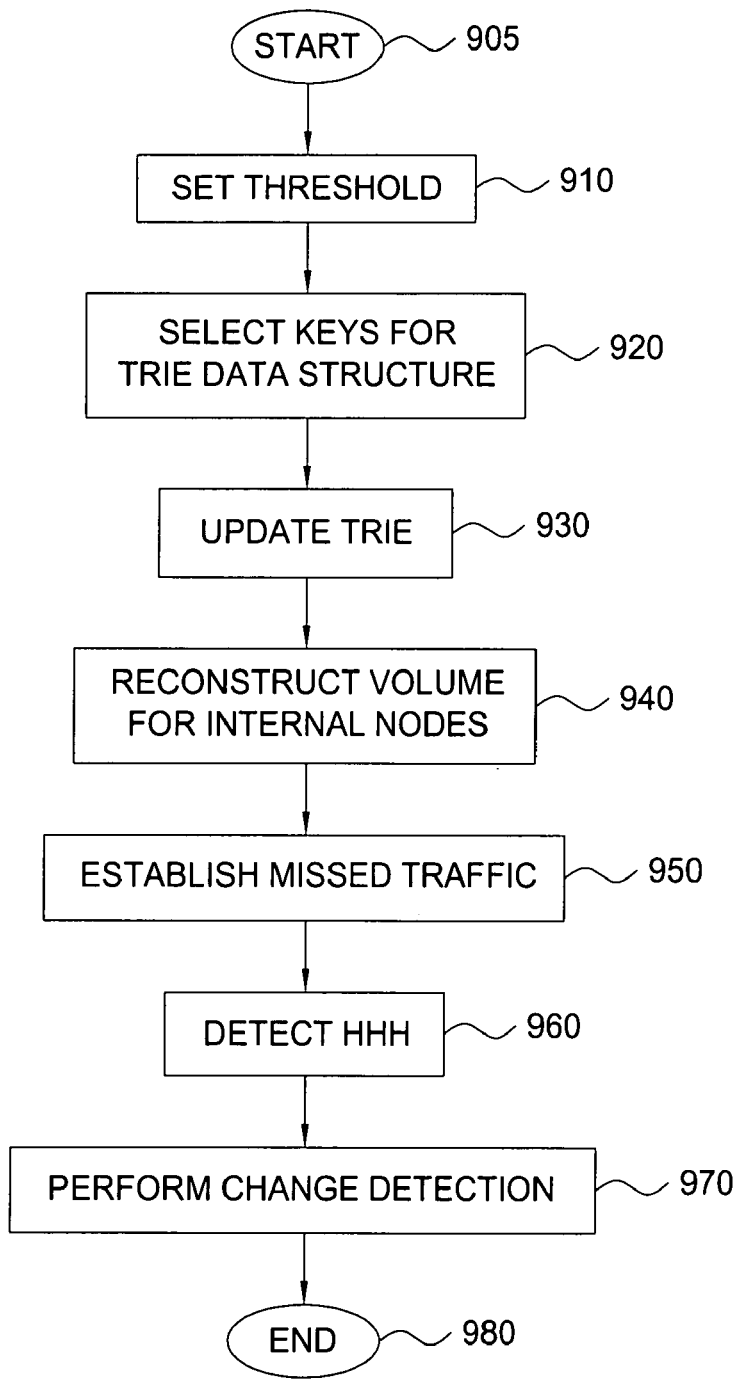
FIG. 9 illustrates a flowchart of a method for detecting a multi-dimensional hierarchical heavy hitter.

FIG. 9 illustrates a flowchart of a method 900 for detecting a multi-dimensional hierarchical heavy hitter. Method 900 starts in step 905 and proceeds to step 910.

In step 910, method 900 sets a threshold, e.g., $T_{split}$. This threshold is used to determine when a node will split.

In step 920, method 900 select a plurality of keys, e.g., associated with IP source address, IP destination address, port number and the like, for a trie data structure, e.g., 200 of FIG. 2.

In step 930, the trie data structure is updated. For example, for each packet received, the trie data structure is updated with respect to returning the longest matching prefix and incrementing the volume of the relevant node. It should be noted that step 930 is repeated for a predefined period of time in accordance with the specific requirement of a particular implementation. In other words, within a certain defined period or time interval, e.g., one minute, five minutes, one hour, and so on, packets are received and the trie data structure is updated for each received packet.

In step 940, method 900 reconstructs or aggregate volume for each of the internal nodes. For example, at the end of a time interval, the present invention performs a recursive post-order traversal of the trie structure.

In step 950, method 900 estimates the missed traffic corresponding to each node, since all packets are not captured and analyzed. Various methods for estimating missed traffic can be used, e.g., the copy-all method, the no-copy method and the splitting method as discussed.

In step 960, method 900 detects the HHHs. For example, since method 400 now has the observed traffic and the estimated traffic for a node, it can now combine the observed and estimated missed traffic, where the combined traffic can be compared with historical or predicted measure of total traffic for that node. Method 900 is then able to determine the HHH(s).

Once the HHHs are detected, method 900 in step 970 can implement any number of change detection methods to detect changes or anomalous events in the network. The important aspect is then once the network is able to determine HHHs, the network is better equipped to more accurately and efficiently detect anomalous events. Method 900 may proceed to perform other post analysis or functions, e.g., reporting function, and the like. Method 900 ends in step 980.

Figure 10:
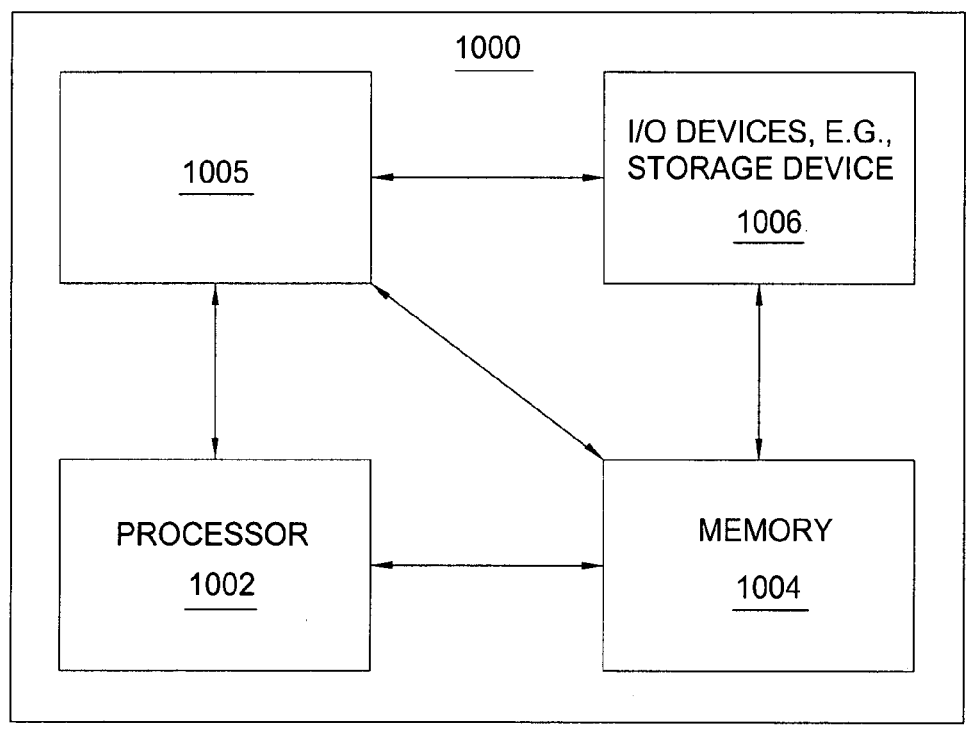
FIG. 10 illustrates a high level block diagram of a general purpose computer suitable for use in performing the functions described herein.

FIG. 10 illustrates the flowchart of the current invention. The invention provides a method for making a conservative estimate of the traffic and sets the threshold (1010). The threshold, the keys and the fields for detecting anomalies are selected (1020). For every received packet a determination is made on whether it needs to be split into smaller packets (1030). The packets that are too large are split (1040). The longest matching prefixes are then determined in each dimension (1050). For the selected method, the method then looks up the hash tables and updates the volumes (1060). A post order traversal is then performed to reconstruct the volumes of the internal nodes (1070). The volume of the missed traffic is estimated (1080) and the result is added to the volume of the observed traffic (1090). The result is then used as an input to the HHH detection module (1092) and also fed back to the threshold determination module. The output of the HHH determination module is tracked across time to search for anomalies (1094).

FIG. 10 depicts a high level block diagram of a general purpose computer suitable for use in performing the functions described herein. As depicted in FIG. 10, the system 1000 comprises a processor element 1002 (e.g., a CPU), a memory 1004, e.g., random access memory (RAM) and/or read only memory (ROM), a multidimensional hierarchical heavy hitter detection module 1005, and various input/output devices 1006 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present multidimensional hierarchical heavy hitter detection module or process 1005 can be loaded into memory 1004 and executed by processor 1002 to implement the functions as discussed above. As such, the present multidimensional hierarchical heavy hitter detection method 1005 (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting at least one hierarchical heavy hitter from a stream of packets, comprising:
   receiving at least one packet from said stream of packets;
   associating at least two keys with at least two fields of said at least one packet;
   applying an adaptive trie data structure, where each node of said adaptive trie data structure is associated with said at least two keys; and
   using said adaptive trie data structure to determine said at least one hierarchical heavy hitter, wherein said using said adaptive trie data structure to determine said at least one hierarchical heavy hitter comprises:
      reconstructing a volume for each node that is an internal node;
      estimating missed traffic for each of said internal node; and
      determining said at least one hierarchical heavy hitter in accordance with a combination of said reconstructed volume and said estimated missed traffic.

2. The method of claim 1, wherein said estimating missed traffic comprises using at least one of: a copy-all method, a no-copy method, or a splitting method.

3. A computer-readable medium having stored thereon a plurality of instructions, the plurality of instructions including instructions which, when executed by a processor, cause the processor to perform the steps of a method for detecting at least one hierarchical heavy hitter from a stream of packets, comprising:
   receiving at least one packet from said stream of packets;
   associating at least two keys with at least two fields of said at least one packet;
   applying an adaptive trie data structure, where each node of said adaptive trie data structure is associated with said at least two keys; and
   using said adaptive trie data structure to determine said at least one hierarchical heavy hitter, wherein said using said adaptive trie data structure to determine said at least one hierarchical heavy hitter comprises:
      reconstructing a volume for each node this is an internal node;
      estimating missed traffic for each of said internal node; and
      determining said at least one hierarchical heavy hitter in accordance with a combination of said reconstructed volume and said estimated missed traffic.

4. The computer-readable medium of claim 3, wherein said estimating missed traffic comprises using at least one of: a copy-all method, a no-copy method, or a splitting method.

* * * * *